United States Patent [19]
Herlehy et al.

[11] Patent Number: 5,863,425
[45] Date of Patent: Jan. 26, 1999

[54] FILTER BAG FOR A POOL CLEANER

[75] Inventors: Timothy D. Herlehy, Pacific Beach; Isain S. Monge, Vista, both of Calif.

[73] Assignee: Polaris Pool Systems, San Marcos, Calif.

[21] Appl. No.: 877,634

[22] Filed: Jun. 19, 1997

[51] Int. Cl.⁶ ........................................ E04H 4/16
[52] U.S. Cl. .................... 210/169; 210/232; 210/238; 210/460; 15/1.7
[58] Field of Search ........................ 210/169, 232, 210/238, 460, 448, 445; 15/1.7; 55/DIG. 26, 356, 376, 505, 525, 378, 379

[56] References Cited

U.S. PATENT DOCUMENTS

| D. 288,373 | 2/1987 | Alanis . | |
|---|---|---|---|
| 3,822,754 | 7/1974 | Henkin et al. . | |
| 4,558,479 | 12/1985 | Greskovics et al. . | |
| 4,575,423 | 3/1986 | Alanis et al. . | |
| 4,589,986 | 5/1986 | Greskovics et al. . | |
| 4,618,420 | 10/1986 | Alanis . | |
| 4,643,217 | 2/1987 | Frentzel . | |
| 4,880,531 | 11/1989 | Blake et al. | 210/169 |
| 5,064,455 | 11/1991 | Lackner | 55/375 |
| 5,128,034 | 7/1992 | Kool | 210/232 |
| 5,186,828 | 2/1993 | Mankin | 210/232 |
| 5,186,829 | 2/1993 | Janik | 210/232 |
| 5,308,483 | 5/1994 | Sklar et al. | 210/232 |
| 5,400,465 | 3/1995 | Bosses et al. | 15/339 |

Primary Examiner—Jay H. Woo
Assistant Examiner—Fred Prince
Attorney, Agent, or Firm—Kelly Bauersfeld Lowry & Kelley, LLP.

[57] ABSTRACT

An improved filter bag is provided for mounting onto a suction mast of a pool cleaner to retain and collect debris and the like vacuumed by the pool cleaner from submerged floor or wall surfaces of a swimming pool. The filter bag includes a porous bag-shaped filter element having an open mouth mounted to a latch collar adapted for quick release coupling to a downstream end of the pool cleaner suction mast. The filter element and latch collar include interfitting alignment members to insure filter element assembly with the latch collar in a desired front-to-rear orientation. The suction mast and latch collar further include additional interfitting alignment members for latch collar mounting onto the pool cleaner in a desired front-to-rear orientation, thereby insuring proper orientation of the filter bag on the pool cleaner.

19 Claims, 5 Drawing Sheets

FILTER BAG FOR A POOL CLEANER

BACKGROUND OF THE INVENTION

This invention relates generally to improvements in cleaning devices and equipment for use in cleaning swimming pools and the like. More particularly, this invention relates to an improved filter bag for use with a swimming pool cleaner of the type designed for travel over submerged pool surfaces to collect grit and debris settled thereon, wherein the improved filter bag is designed for facilitated assembly and subsequent quick release mounting onto a pool cleaner in a manner to insure proper and pre-aligned orientation of the filter bag on the pool cleaner.

Automatic swimming pool cleaners are generally well known in the art for use in maintaining a swimming pool in an overall state of cleanliness. In this regard, residential and commercial swimming pools normally include a standard water filtration system including a main circulation pump and related main filter unit for filtering the pool water. The filtration system is typically operated for several hours on a daily basis to draw water from the pool for flow through the main filter unit and subsequent return circulation to the pool, wherein the filter unit includes an appropriate filter media for collecting and thus removing solid debris such as fine grit and silt, twigs, leaves, insects, and other particulate matter suspended within the pool water. Although such filtration systems function efficiently to collect suspended particulate, it has been recognized that some particulate tends to settle onto submerged pool floor and wall surfaces and thus is not removed by the standard filtration system. Automatic swimming pool cleaners have been developed and are widely used to assist in a more thorough cleaning of the pool by directly collecting such settled matter, and/or by re-suspending the settled matter so that it can be collected by the main filter unit.

More specifically, in one common form, the automatic swimming pool cleaner comprises a relatively compact wheeled housing adapted to travel randomly over submerged floor and wall surfaces of the pool. The cleaner is normally connected by a hose into the standard filtration system, such as by connection to the positive pressure discharge side of the system as described in U.S. Pat. Nos. 4,558,479; 4,589,986; and 3,822,754, or by connection to the negative pressure suction side of the system as described in U.S. Pat. Nos. 5,105,496; 4,729,406; and 4,643,217. In either case, the filtration system provides a water flow to and through the cleaner, wherein this water flow is typically used to create or induce a suction flow through a suction mast for vacuuming grit and debris through the suction mast into a porous mesh filter bag mounted on a downstream end thereof. The water flow through the pool cleaner is also frequently used to power a hydraulic drive means which causes the cleaner to travel about within the swimming pool. The filter bag is designed for periodic removal from the cleaner so that accumulated debris therein can be disposed, followed by re-mounting of the filter bag onto the pool cleaner.

Filter bags for pool cleaners are commonly constructed and shaped for mounting onto the pool cleaner in a predetermined orientation in order to achieve maximum cleaning effectiveness. In particular, according to one common filter bag configuration, the bag is designed with an open mouth connected to a mounting collar or the like adapted for removable mounting onto an upper end of the suction mast. The bag is shaped to define an interior which extends upwardly above the mouth and then expands rearwardly. With this geometry, debris flowing upwardly from the suction mast into the bag interior will tend to displace to and settle within a rear region or pocket of the bag as a result of the forward motion of the pool cleaner. Debris retention within the rear pocket is important to prevent collected debris from falling back through the suction mast when the pool cleaner, normally operated on an intermittent basis, is turned off. Some filter bags include a releasable seam at the rear pocket for facilitated emptying of the bag. Exemplary filter bags of this general type are shown and described in U.S. Pat. Nos. 4,618,420; 4,575,423; and 288,373.

In the past, filter bags for pool cleaners have been susceptible to mounting of the bag onto the pool cleaner suction mast in an incorrect orientation, typically by permitting the bag to be installed backwards with the rear pocket extending forwardly from the suction mast. Improper bag orientation can also occur as a result of incorrect assembly of the bag with the related mounting collar during filter bag manufacture. Such incorrect bag mounting results in inefficient pool cleaner operation and creates the potential for dissatisfaction among pool cleaner customers.

There exists, therefore, a significant need for improvements in and to filter bags for pool cleaners, wherein the filter bag is designed for correct, unidirectional or one-way mounting onto the suction mast of a pool cleaner. The present invention fulfills this need and provides further related advantages.

SUMMARY OF THE INVENTION

In accordance with the invention, an improved filter bag is provided for mounting onto the suction mast of a swimming pool cleaner to collect and retain grit and other particulate matter vacuumed through the suction mast from submerged floor and wall surfaces of a swimming pool or the like. The filter bag comprises a porous mesh bag-shaped filter element having an open mouth mounted to a latch collar adapted in turn for quick release coupling to the upper or downstream end of the pool cleaner suction mast. The filter element and latch collar include cooperative first alignment means for aligning the filter element in a predetermined front-to-rear orientation relative to the latch collar. The latch collar and suction mast include cooperative second alignment means for permitting unidirectional or one-way mounting of the latch collar in a predetermined front-to-rear orientation on the suction mast.

In the preferred form of the invention, the porous filter element has a shape extending generally upwardly and rearwardly from the open mouth thereof. The filter element defines, at the open mouth, a generally cylindrical sleeve having a plurality of radially outwardly open alignment ports formed therein. In the preferred form, these alignment ports are formed in a reinforcement cuff of flexible vinyl or the like which is attached to the porous material of the filter element by a sewn seam. The ported cuff is sized and shaped for slide-fit reception over a generally cylindrical mounting base having a plurality of short radially outwardly projecting alignment pins formed thereon. These alignment pins are provided in a number and array for mated reception through the alignment ports formed in the cuff. The alignment pins and ports thus define the cooperative first alignment means and are arranged such as by providing one or more mated pins and ports of different size to insure mounting of the filter element onto the mounting base of the latch collar in a desired and predetermined front-to-rear orientation. An outer shroud ring is slidably fitted over the assembled cuff and mounting base to retain the components in assembled relation.

The latch collar mounting base further includes a pair of latch clips projecting downwardly from opposite sides thereof. These latch clips each include a downwardly projection spring arm terminating in a radially outwardly projecting tapered latch button for spring-biased reception into a corresponding radially outwardly open latch port formed in the suction mast near the upper end thereof. The latch clip spring arms are adapted to squeeze radially inwardly to accommodate reception into the upper end of the suction mast, followed by outward spring action to seat the latch buttons in the latch ports to lock the filter bag onto the suction mast. Subsequent filter bag removal is accomplished by depressing the latch buttons, exposed through the latch ports, to release the filter bag from the suction mast.

In accordance with a further aspect of the invention, the latch collar mounting base and the suction mast include the second alignment means for one-way latch collar installation onto the suction mast with the filter bag in a desired and predetermined front-to-rear orientation relative to the pool cleaner. In the preferred form, the second alignment means comprises a key and slot mechanism with a key on the suction mast positioned to nest within a mating slot formed in peripheral rim on the mounting base for slide-fit reception into the upper end of the suction mast.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
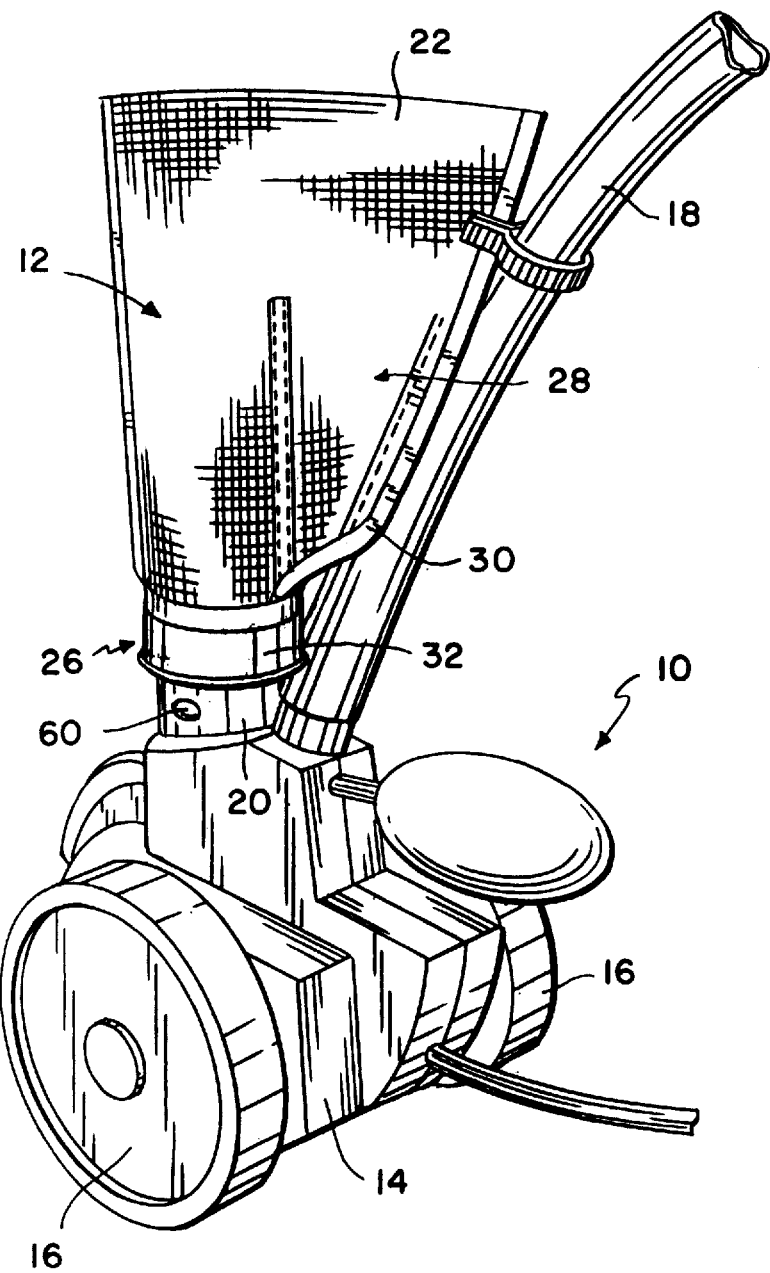
FIG. 1 is a perspective view showing an exemplary swimming pool cleaner having an improved filter bag embodying the novel features of the invention mounted thereon.
Figure 2:
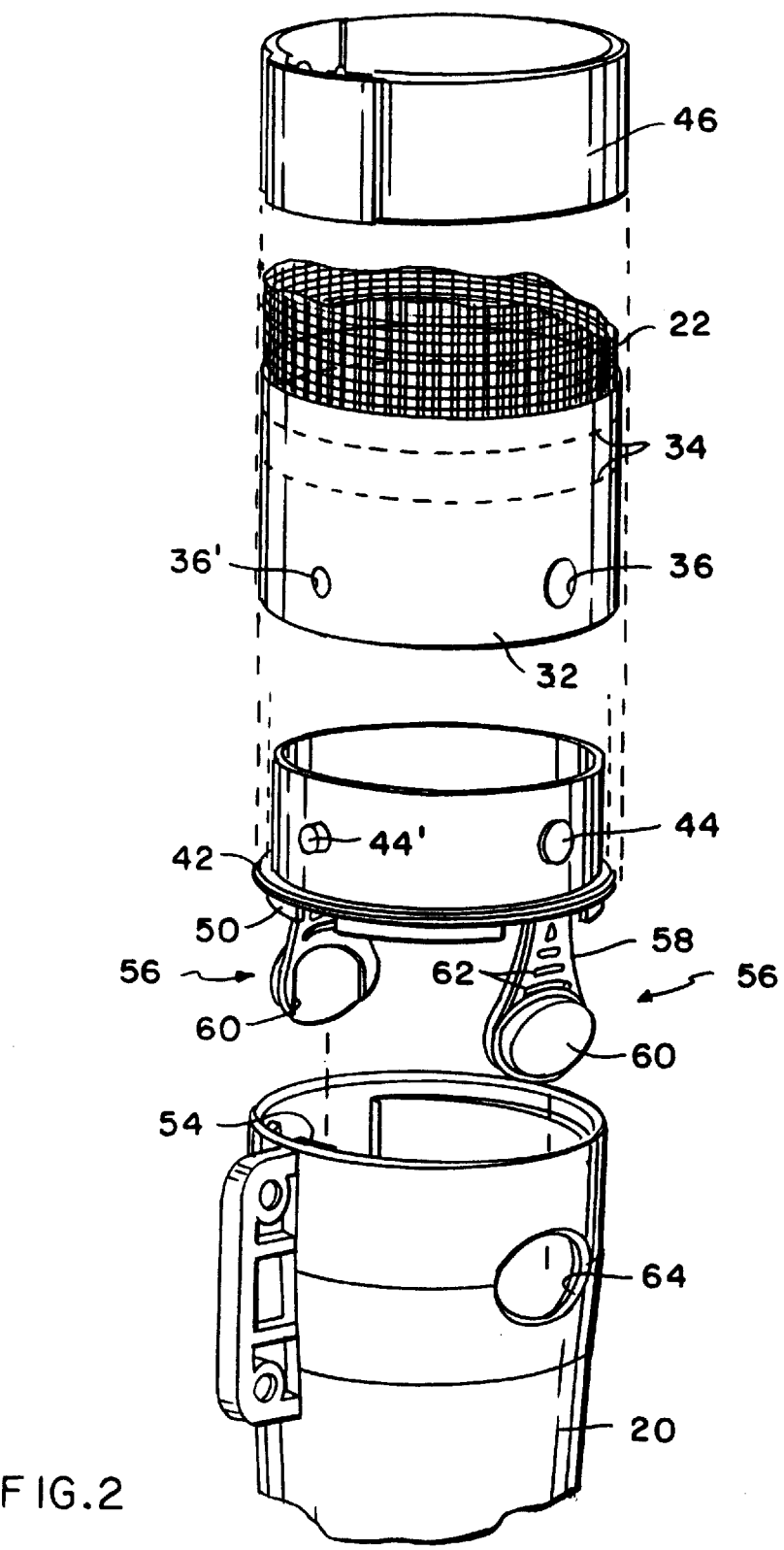
FIG. 2 is an exploded perspective view showing a latch collar for mounting onto the filter bag and for quick release mounting onto the upper end of a suction mast on the pool cleaner.
Figure 3:
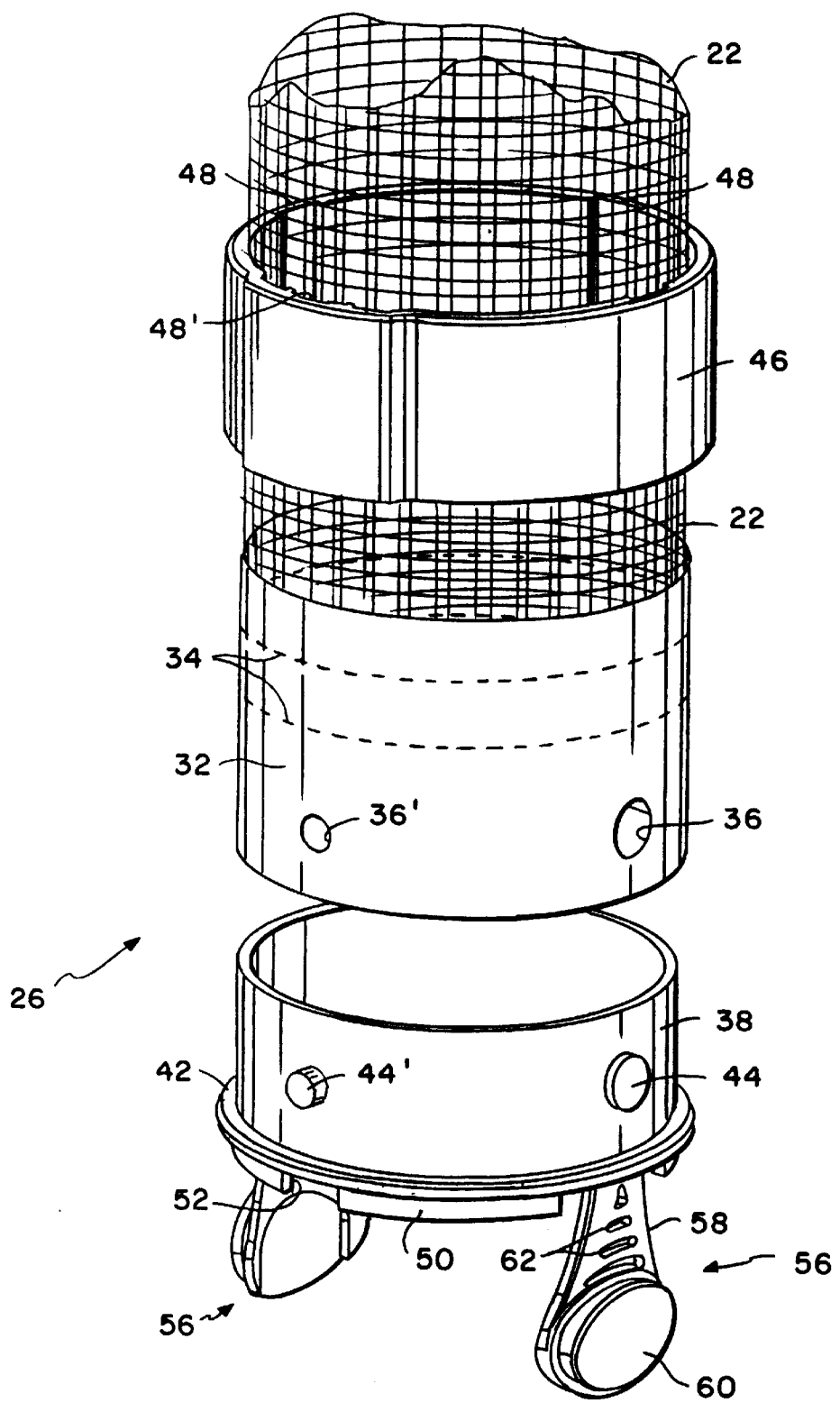
FIG. 3 is an enlarged exploded perspective view illustrating assembly of filter bag components.
Figure 4:
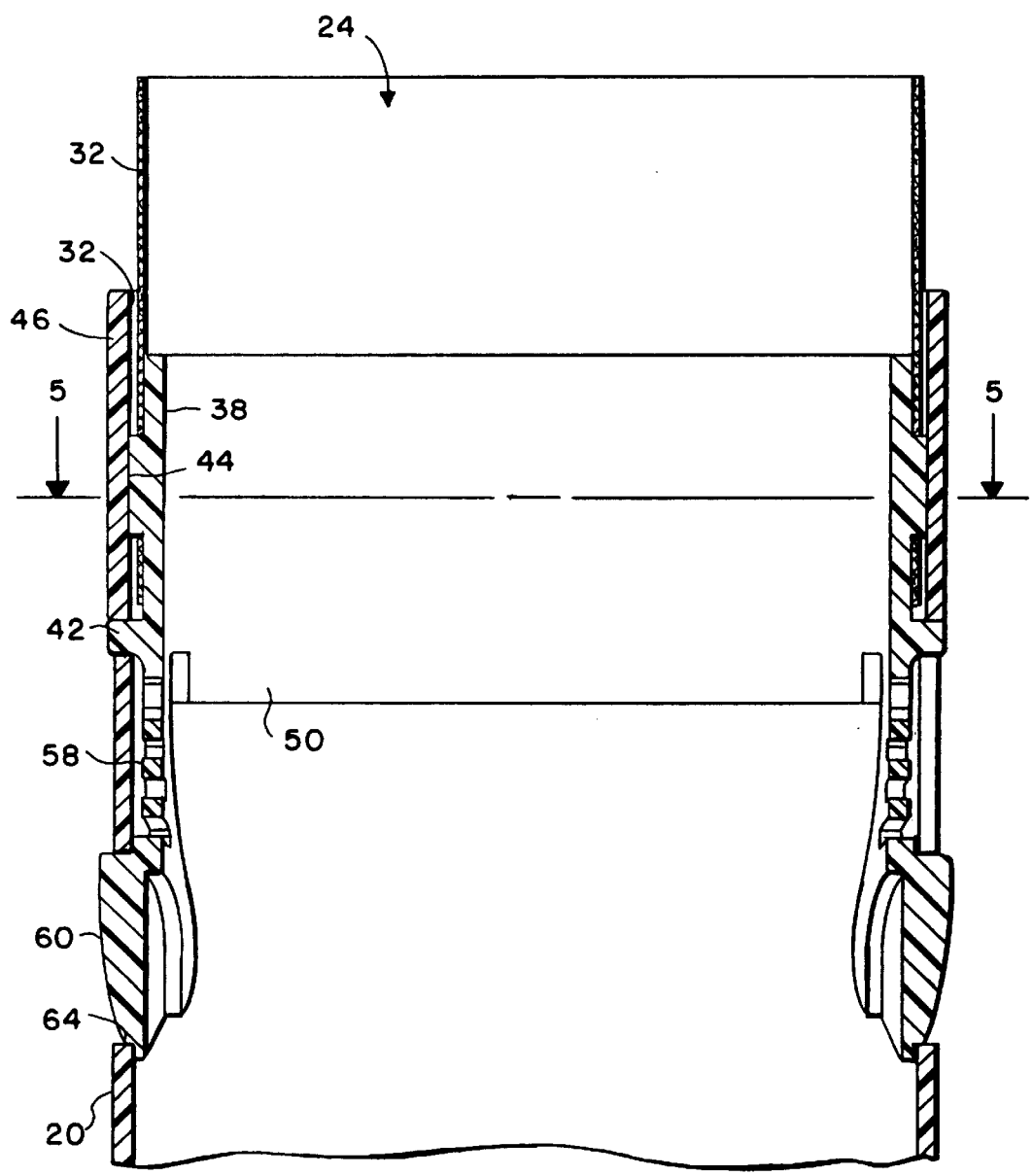
FIG. 4 is a fragmented vertical sectional view taken generally on the line 4—4 of FIG. 2.
Figure 5:
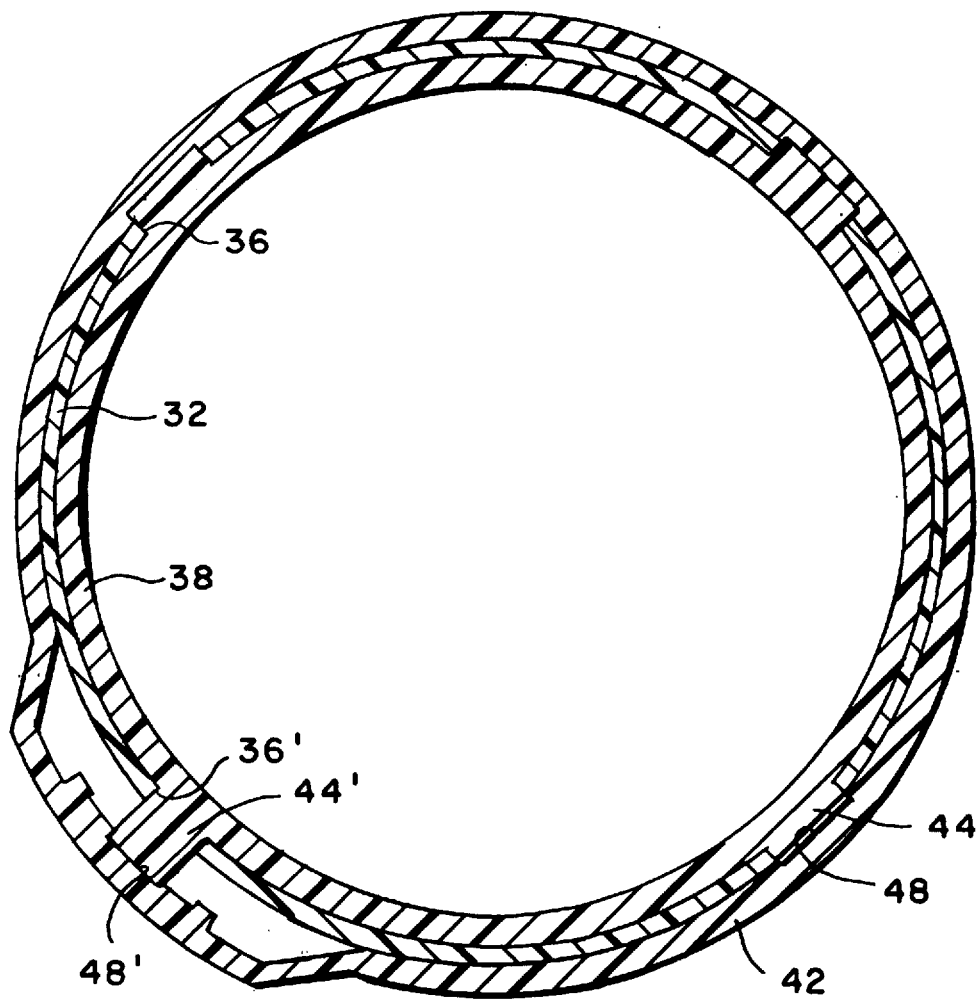
FIG. 5 is a horizontal sectional view taken generally on the line 5—5 of FIG. 4.

As shown in the exemplary drawings, a pool cleaner referred to generally in FIG. 1 by the reference numeral 10 is equipped with an improved filter bag 12 for collecting and retaining particulate debris vacuumed by the pool cleaner 10 from submerged floor and wall surfaces of a swimming pool or the like. The improved filter bag 12 is designed for unidirectional or one-way mounting onto the pool cleaner 10, with the filter bag in the correct front-to-rear orientation relative to the cleaner 10 for optimum operational efficiency.

The pool cleaner 10 generally comprises a conventional automatic swimming pool cleaner of the type adapted for substantially random travel over submerged pool surfaces to pick up and collect settled particulate matter such as grit, silt, twigs, leaves, etc., and/or to assist in re-suspending such matter so that it can filtered from the pool water by a main filtration system (not shown). The pool cleaner 10 comprises a compact housing 14 carried on a plurality of wheels 16. An internal drive means (not shown) is provided for causing the pool cleaner 10 to travel about within the pool, with said internal drive means being typically powered hydraulically by a water flow coupled via a hose 18 with the main filtration system. In one common form, the water flow is a positive pressure flow to the pool cleaner as shown and described in U.S. Pat. Nos. 4,558,479; 4,589,986; and 3,822,754, which are incorporated by reference herein. In another common form, the water flow is a negative pressure or suction flow from the pool cleaner as shown and described in U.S. Pat. Nos. 5,105,496; 4,729,406; and 4,643,217, which are also incorporated by reference herein. In either case, the water flow also creates or induces an upward suction or vacuum flow of water through a generally vertically oriented suction mast 20 on the pool cleaner 10 to vacuum particulate matter settled upon submerged pool surfaces. The filter bag 12 is designed for quick release mounting, in a desired and predetermined orientation, at the upper end of the suction mast 20.

In general terms, the filter bag 12 has an overall configuration similar to the filter bag shown and described in U.S. Pat. Nos.4,618,420; 4,575,423: and D288,733, which are incorporated by reference herein. More particularly, as shown generally in FIG. 1, the filter bag 12 comprises a filter element 22 formed in the shape of a hollow bag to define a porous mesh body and a generally cylindrical and downwardly open mouth 24 at a front and lower end thereof. The mouth 24 carries a mounting means shown in the illustrative drawings in the form of a latch collar 26 for removable quick release connection to the upper end of the suction mast 20. When installed onto the pool cleaner 10, the bag extends from the open mouth 24 upwardly and then turns rearwardly to define a rear chamber or pocket 28. In operation, a suction water flow upwardly through the suction mast 20 carries particulate matter upwardly into the filter bag 12 as the pool cleaner 10 travels forwardly within the swimming pool, whereby the particulate matter enters the bag and tends to settle therein within the rear pocket 28. A separable seam 30 is desirably provided adjacent to this rear pocket 28 to permit periodic direct access to the collected debris for disposal. See U.S. Pat. Nos. 4,618,420 and 4,575,423.

In accordance with the present invention, the improved filter bag 12 includes alignment means for insuring correct front-to-rear alignment of the filter bag 12 relative to the pool cleaner 10, to insure correct positioning of the debris collection pocket 28 behind the suction mast 20 when the bag is installed onto the pool cleaner. Alternately stated, the present invention precludes incorrect installation of the filter bag 12 with the debris collection pocket 28 in any other front-to-rear orientation relative to the suction mast, to correspondingly insure substantially optimum cleaning efficiency for the pool cleaner. Proper front-to-rear alignment of the filter bag 12 is achieved by first alignment means for orienting the filter element 22 relative to the latch collar 26, and second alignment means for orienting the latch collar 26 relative to the suction mast.

More specifically, as shown in more detail in FIGS. 2–5, in accordance with a preferred form of the invention, the cylindrical open mouth 24 of the filter element 22 incorporates a cylindrical nonporous and scuff or abrasion resistant reinforcement cuff 32 attached to the mesh filter element material by a sewn seam 34 or the like. The reinforcement cuff 32, which may be constructed from a flexible yet sturdy vinyl plastic or similar material, has a plurality of radially outwardly open alignment ports 36 formed therein. The illustrative drawings show four alignment ports 36 formed about the circumference of the cuff 32 at approximate ninety degree intervals, with a selected one 36' of the alignment ports having a distinctly different size such as the smaller size for the port 36' shown in FIG. 3. In the preferred form, this differently sized alignment 36' is formed in the cuff 32 at a location aligned with a rear edge of the filter element 22. Alternately, it will be recognized and understood that the alignment ports may be formed directly in the filter element 22, in which case the reinforcement cuff 32 may be omitted.

The reinforcement cuff 32 has a size and shape for slide-fit placement about the latch collar 26. This latch collar 26 comprises a generally cylindrical mounting base 38 which may be conveniently formed from lightweight molded plastic for reception into the cuff 32, with a lower end margin of the cuff 32 drawn against a radially outwardly projecting peripheral flange 42. Importantly, a plurality of short latch pins 44 are formed on the mounting base 38 to project radially outwardly therefrom in an array corresponding with the array of alignment ports 36 formed in the cuff 32. A selected one 44' of the latch pins 44 is formed with a distinctly different size for mated reception into the corresponding differently sized alignment port 36' in the cuff 32. This differently sized latch pin 44' is positioned at a rear edge of the mounting base 38, whereby the latch ports 36 and the matingly configured latch pins 44 comprise first alignment means for insuring one-way assembly of the filter element 22 onto the mounting base 38 with their respective rear edges aligned.

An outer shroud ring 46 is provided for slip-fit mounting over the assembled reinforcement cuff 32 and mounting base 38. The shroud ring 46 may also be constructed from lightweight molded plastic, and may be sized for secure friction fit or snap-fit over the assembled components to retain the filter element 22 in the desired front-to-rear orientation on the latch collar, when those components are properly assembled in pre-aligned relation as described above. Conversely, the shroud ring 46 is sized so that it will not fit or otherwise will fit unacceptably over the cuff 32 and mounting base 38, if the alignment ports 36 and pins 44 are not properly interfitted. In this regard, the shroud ring 46 desirably includes internal axially extending slots 48 formed in an array to correspond with and receive the latch pins 44 on the mounting base 38, with one of the slots 48' being shown with a deeper dimension for mated slide-fit reception of the smaller diameter but longer length latch pin 44'. With this construction, the shroud ring 46 is also carried on the mounting base 38 in a predetermined front-to-rear orientation. Friction fit or snap-fit mounting of the shroud ring 46 permits periodic disassembly thereof from the mounting base 38 for occasional replacement of the filter element 22. Alternately, the shroud ring 46 may be affixed to the mounting base 38 by a suitable adhesive or by other means such as ultrasonic welding or the like.

The mounting base 38 of the latch collar 26, in combination with the suction mast 20, further includes a second alignment means for insuring proper front-to-rear alignment of the latch collar relative to the pool cleaner. More particularly, the mounting base 38 includes a short radially inset peripheral rim 50 at the lower or leading edge thereof for guided slide-fit reception into the upper end of the suction mast 20, when the filter bag 12 is installed onto the pool cleaner. This rim 50 nests within the upper edge of the suction mast, with the flange 42 of the mounting base 38 rested upon the uppermost margin of the suction mast. Importantly, the rim 50 incorporates a short slot or gap 52 at a rear edge of the latch collar 26, wherein this gap 52 is sized for mated reception of a key 54 formed within the top of the suction mast 20 at a rear edge thereof. Accordingly, seated reception of the latch collar flange 42 on the top edge of the suction mast 20 is permitted if and only if the latch collar 26 is rotationally aligned for interfitted engagement of the key 54 into the slot 52.

The filter bag 12 additionally includes a pair of latch clips 56 for removable quick release locking of the latch collar 26 onto the suction mast 20. These latch clips 56 are formed integrally with the mounting base 38 and protrude axially from opposed lateral sides thereof for slide-fit reception into the open upper end of the suction mast. Each latch clip 56 comprises an axially extending spring arm 58 shown with an upper narrow end joined to the mounting base 38 and extending downwardly therefrom with a widening or tapering shape to a lower end carrying a radially outwardly presented latch button 60. The spring arms 58 desirably have one or more slots 62 formed therein to provide the spring arms with a controlled resiliency. The latch buttons 60 are tapered to thinner lower margins, as shown best in FIG. 4, so that they can be inserted into and pushed downwardly within the upper end of the suction mast. During such insertion, the spring arms 58 allow the latch buttons 60 to move or squeeze radially inwardly until the latch collar 26 is properly seated upon the suction mast 20, at which time the latch buttons 60 are aligned with and springably pop outwardly into a pair of latch ports 64 formed in the suction mast. As shown, the latch ports 64 and the latch buttons 60 have a mating generally elliptical shape, with a major axis aligned generally in a plane disposed generally perpendicular to a center axis of the suction mast, for facilitated manual fingertip depression of the latch buttons 60 to permit manual pull-off removal of the filter bag from the pool cleaner, when desired.

The improved filter bag 12 of the present invention thus provides for unidirectional filter bag mounting onto the associated pool cleaner, with the filter bag properly aligned with the pool cleaner for best cleaning operation. The filter element 22 is pre-aligned with the latch collar 26, which is in turn pre-aligned with the suction mast. As a result, the filter bag 12 cannot be mounted onto the pool cleaner in an incorrect orientation.

A variety of further modifications and improvements in and to the filter bag of the present invention will be apparent to those persons skilled in the art. Accordingly, no limitation on the invention is intended by way of the foregoing description and accompanying drawings, except as set forth in the appended claims.

What is claimed is:

1. A filter bag for use with a pool cleaner having a suction mast for water flow therethrough to vacuum debris from submerged surfaces of a swimming pool, said filter bag comprising:

a generally bag-shaped filter element having a generally cylindrical open mouth;

a mounting collar connected to said filter element mouth, said collar including means for removable mounting to the suction mast generally at a downstream end thereof; and first cooperatively interfitting alignment means on said filter element and said collar for permitting one-way connection thereof with said filter element in a predetermined orientation relative to said collar;

said removable mounting means of said collar including second alignment means for permitting one-way mounting thereof in a predetermined orientation relative to the suction mast.

2. The filter bag of claim 1 wherein said filter element has a porous mesh body.

3. The filter bag of claim 1 wherein said filter element has a reinforcement cuff attached to said mouth.

4. The filter bag of claim 1 wherein said first alignment means comprises interfitting alignment members formed on said filter element and said collar for orienting said filter element in a predetermined front-to-rear orientation relative to said collar.

5. The filter bag of claim 4 wherein said interfitting alignment members comprise a plurality of radially open alignment ports formed in said filter element mouth, and a corresponding plurality of radially extending alignment pins formed on said collar for respective reception through said alignment ports.

6. The filter bag of claim 5 wherein said alignment pins project radially outwardly from said collar, said mouth of said filter element being slidably fitted over said collar for reception of said alignment pins through said alignment ports, and further including a shroud ring slidably fitted over said mouth and collar to retain said mouth and collar in assembled relation.

7. The filter bag of claim 6 wherein said shroud ring frictionally retains said mouth and collar in assembled relation.

8. The filter bag of claim 6 wherein said shroud ring has a plurality of axially extending slots formed therein for slide-fit reception of said alignment pins.

9. The filter bag of claim 5 wherein at least one of said alignment ports is formed with a size different from the others of said alignment ports, said alignment pins on said collar being formed with sizes for mating reception through said ports.

10. The filter bag of claim 5 wherein said alignment ports are formed in a reinforcement cuff incorporated into said mouth.

11. The filter bag of claim 1 wherein said second alignment means comprises interfitting alignment members formed on said collar and the suction mast.

12. The filter bag of claim 11 wherein said interfitting alignment members comprise a key on the suction mast, and a matingly shaped key slot formed on said collar.

13. The filter bag of claim 1 wherein said removable mounting means further comprises a pair of latch clips on said collar, each of said latch clips including a spring arm and a latch button, said latch buttons being springably receivable into open latch ports formed in the suction mast to removably lock said collar onto the suction mast.

14. The filter bag of claim 13 wherein said latch ports have a noncircular shape with an elongated dimension extending generally in a direction perpendicular to a central axis of the suction mast.

15. A filter bag for use with a pool cleaner having a suction mast for water flow therethrough to vacuum debris from submerged surfaces of a swimming pool, said filter bag comprising:

a generally bag-shaped filter element formed from a porous material, said filter element having an open mouth;

a reinforcement cuff attached to said filter element at said mouth, said cuff having a generally cylindrical shape and defining a plurality of radially outwardly open alignment ports formed therein, at least one of said alignment ports having a size different from the others of said alignment ports;

a mounting collar of generally cylindrical shape and sized for slide-fit assembly with said cuff, said collar defining a plurality of radially extending alignment pins formed in an array and having a size for reception through said alignment ports with said cuff disposed in a predetermined rotational orientation relative to said collar; and means for retaining said cuff and said collar in assembled relation;

said collar further including means for removable mounting onto the suction mast in a predetermined rotational orientation relative to the suction mast, whereby said filter element is mounted relative to the suction mast is a predetermined rotational orientation.

16. The filter bag of claim 15 wherein said removable mounting means comprises interfitting alignment members formed on said collar and the suction mast.

17. The filter bag of claim 16 wherein said interfitting alignment members comprise a key and a key slot.

18. The filter bag of claim 15 wherein said retaining means comprises a retaining ring slidably fitted onto said collar with said cuff interposed between said ring and said collar.

19. The filter bag of claim 18 wherein said alignment pins on said collar extend radially outwardly therefrom, said cuff bring slidably fitted over said collar, and said retaining ring being slidably fitted over said cuff.

* * * * *